United States Patent [19]

Dake

[11] 4,096,955
[45] Jun. 27, 1978

[54] LIFTING MECHANISM

[76] Inventor: Nolan Dake, 378 Connaught Way, Houston, Tex. 77015

[21] Appl. No.: 722,007

[22] Filed: Sep. 10, 1976

[51] Int. Cl.$^2$ ............................................. B60P 1/44
[52] U.S. Cl. .................................. 214/75 G; 214/671; 214/DIG. 13
[58] Field of Search ...................... 214/660, 671, 75 R, 214/75 H, 75 G, 75 T, 77 R, 77 P, 38 CC; 187/9 R

[56] References Cited

U.S. PATENT DOCUMENTS

| | | | |
|---|---|---|---|
| 2,680,529 | 6/1954 | Narvestad et al. | 214/77 P |
| 2,857,066 | 10/1958 | West | 214/707 |
| 2,996,206 | 8/1961 | McKee | 214/38 CC |
| 3,515,294 | 6/1970 | Southward et al. | 214/75 R |
| 3,516,559 | 6/1970 | Walter | 214/75 R |
| 3,638,813 | 2/1972 | Strong | 214/77 R |
| 3,850,322 | 11/1974 | Miles et al. | 187/9 R |
| 3,893,576 | 7/1975 | Casady | 214/75 R |

*Primary Examiner*—Lawrence J. Oresky
*Attorney, Agent, or Firm*—Bernard A. Reiter

[57] ABSTRACT

A lifting mechanism including cantilevered arm means extending from a structural member and vertically movable with respect thereto and having a wheelchair support frame on the remote end of said arm means, and power means operatively associated with said arm means for moving a wheelchair and occupant to and from the vehicle interior and the ground outside the vehicle, and including means for tilting the wheelchair and occupant, prior to lifting, counter to the gravitational forces which induce separation of the occupant from the support frame so as to ensure safety of the occupant during the lifting procedure.

6 Claims, 6 Drawing Figures

LIFTING MECHANISM

BACKGROUND OF THE INVENTION

This invention relates to a lifting mechanism for wheel chairs. More particularly the invention is directed to a lifting mechanism for moving wheel chairs and their occupants into a stable position within a motor vehicle.

The concept of utilizing mechanisms for lifting a wheel chair and its occupant into a motor vehicle is believed to be well known. Such devices are commonly deficient in numerous respects. Foremost, such lifting devices do not generally securely engage the wheel chair carrying the occupant during the lifting and movement thereof to and from the ground or to and from the vehicle interior. Slight movement by the occupant may commonly produce a shifting of the wheel chair on the carrying frame, thus producing a precarious tilting of the chair and general instability during the lifting function. Present devices further are not capable of smoothly and sequentially moving the chair, once lifted, from the exterior to the interior of the vehicle. Still further, such presently known devices are incapable of depositing the chair and occupant in a stable position within the vehicle while orienting the chair in the vehicle in a proper direction, all of this without any substantial assistance by the chair occupant himself or others. These seemingly simple achievements must be readily accomplished without physical assistance of the chair occupant for in many instances the chair occupant may be partially or totally paralyzed and therefore incapable of rendering any aid whatever in effectuating the lifting function of the chair, or effectuating orientation of the chair, once lifted, within the vehicle, or in depositing the chair into a fixed position within the vehicle so that the chair itself cannot constitute a hazard to occupants of the vehicle as a consequence of acceleration or deceleration of the vehicle itself.

DESCRIPTION OF THE INVENTION

The present invention is directed to a lift mechanism for wheel chairs and their occupants and which lift mechanism constitutes an integral structure of a motor vehicle such as a van or the like. The lift mechanism disclosed hereinafter obviates numerous of the problems inherent in presently known lift mechanisms, eliminates certain of the risks inherent in such presently known mechanisms and also provides certain functions and advantages not at all present in presently known lift mechanisms. For example, the present invention substantially eliminates any instability and consequent accidents during lifting of the chair and its occupant from the ground into the vehicle, this because of a unique and unobvious supporting structure between the chair and the lift mechanism itself.

Another advantage of the present invention resides in a plurality of motor-driven articulating arms extending from the vehicle and which co-act with one another in sequential, auto-mechanical manner to not only lift the chair and occupant but to move and turn the chair into the vehicle and deposit same in prescribed position and direction.

A still further feature and advantage of the invention resides in the design of a lifting mechanism for wheel chairs which is integrally affixed within a motor vehicle and which is operated independently within the vehicle.

Yet another feature and advantage in the invention resides in a wheelchair lift apparatus in which the wheel chair is tilted after the occupant is in it but before lifting begins, this in order to ensure against separation of the occupant from the chair during the lifting procedure.

Yet still another feature and advantage of the invention resides in the design of a transfer mechanism which provides for the lifting and transferring of a wheel chair occupant from the wheel chair into a vehicle seat and the positioning of the wheel chair occupant in said seat in a stable and reliable manner so as to enable his subsequent ride in the vehicle.

These and numerous other features and advantages of the invention will become apparent upon the reading of the following detailed description in the specification, claims and drawings, wherein like numerals denote like parts in the various views and wherein:

DETAILED DESCRIPTION OF THE INVENTION

Figure 1:
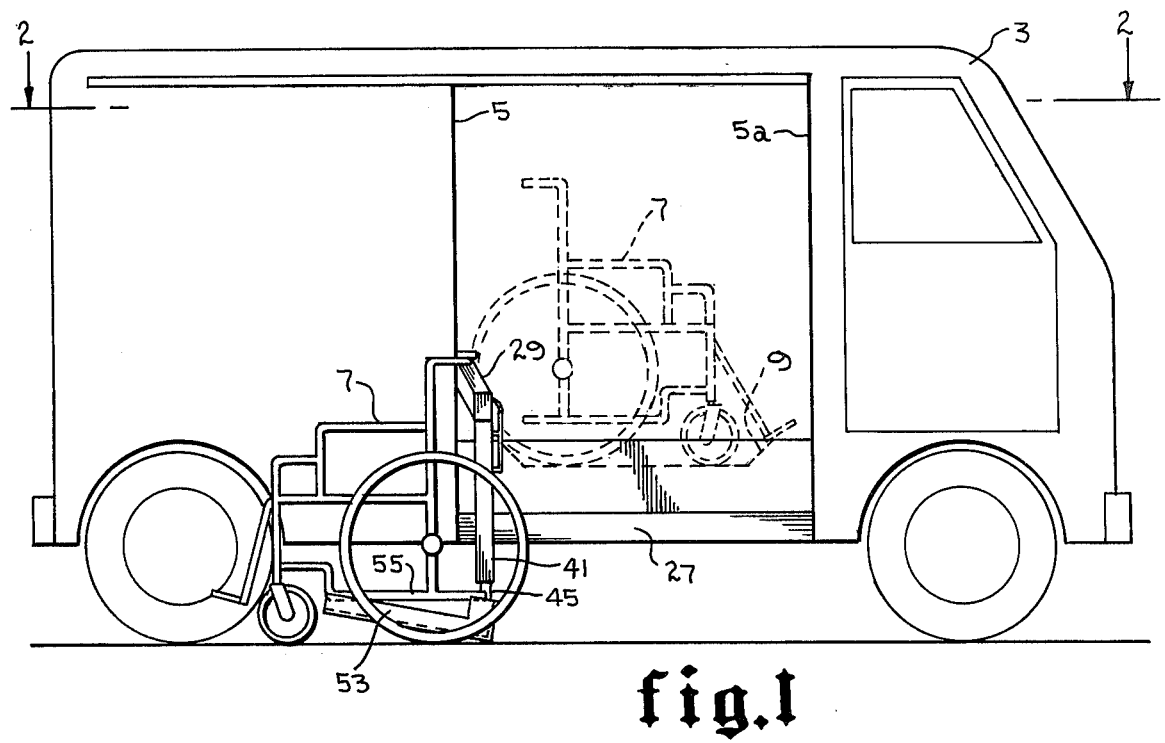
FIG. 1 is an exterior view of a conventional van vehicle showing the wheel chair position on the ground prior to lifting and in a position in the vehicle (in ghost) after lifting thereof.

In FIG. 1 there is shown a van-type vehicle 3 having a side door opening 5 of sufficient width to enable entering and exit of a conventional wheel chair 7 therethrough. The wheel chair is intended to set within the vehicle 3 so that the wheel chair occupant (not shown) faces the same direction as other passengers within the vehicle. The floor of vehicle 3 is characterized by a well 9 which is of appropriate length and width as to receive the wheel chair therein. The walls of the well 9 are of sufficient depth to preclude movement of a wheel chair during operation of the vehicle. The well should be located partially centrally of the vehicle width (See FIG. 2).

Figure 4:
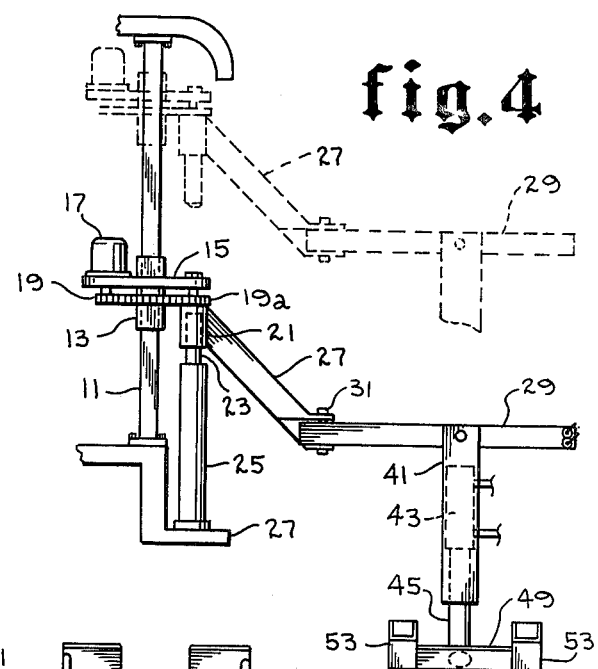
FIG. 4 is a side view of the lifting mechanism showing it in a first and second (ghost) position.
Figure 6:
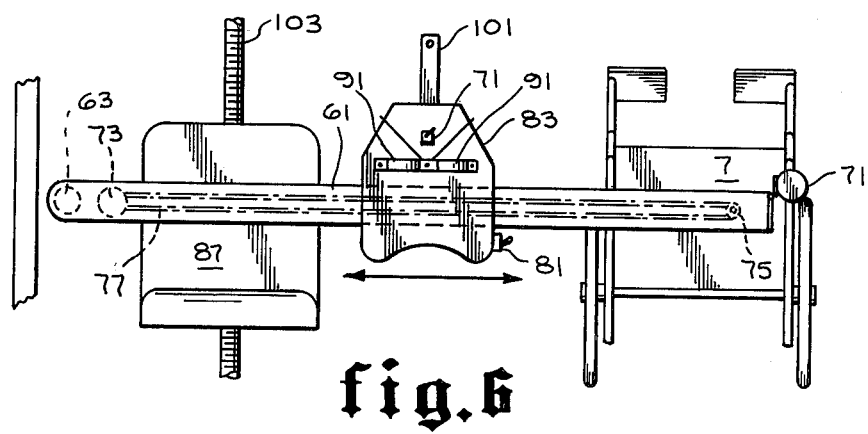
FIG. 6 is a top view of the transfer machine.
Figure 5:
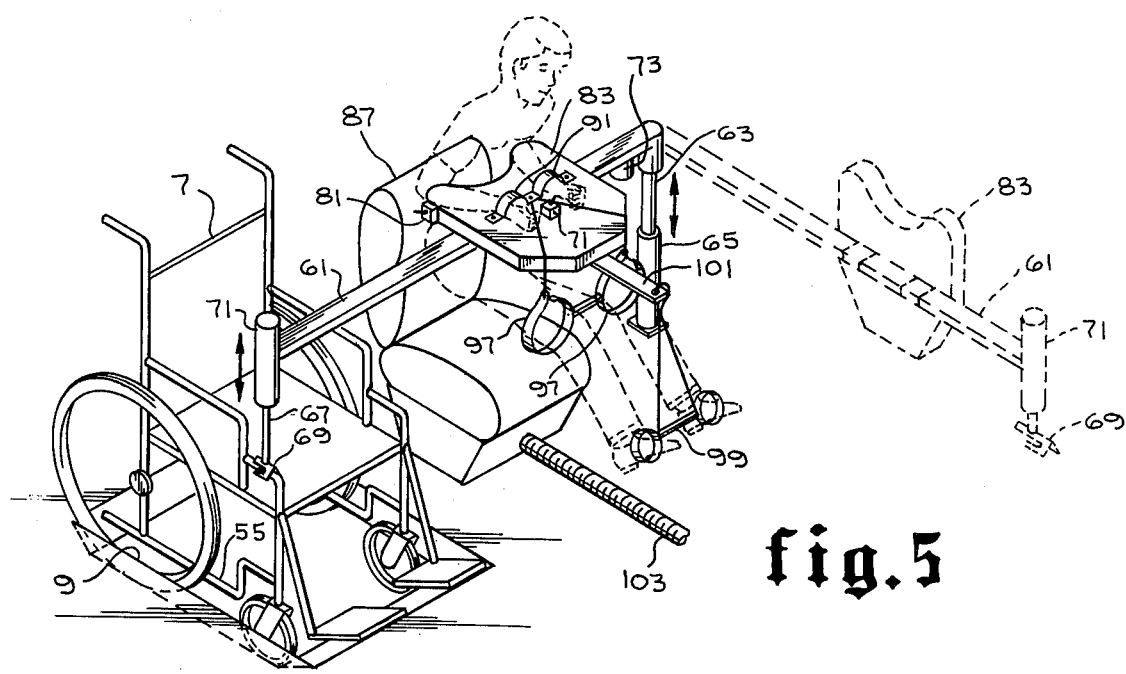
FIG. 5 is an isometric view of the chair deposited within the vehicle and the transfer mechanism for lifting and transporting the chair occupant therefrom to a vehicle seat.

There is disposed adjacent the door opening 5 and rearwardly of the well 9 a strut or structural support means 11, see FIG. 4. The strut 11 may be structurally affixed to the interior floor of the vehicle and extend upwardly to the roof thereof where it may likewise be structurally affixed. The strut 11 serves as a principle supporting member for the lift mechanism and may be adapted to carry a sliding collar 13 or the like thereon. Affixed to the sliding collar is a support plate means 15 which may carry motive power 17 which is driven itself from a power source contained within the vehicle. The motor 17 may be operatively connected to a gear train 19 or the like which is adapted to produce rotational movement of the gear 19a to which is affixed a cap member 21. The cap member 21 is supported by, but arranged to rotate about ram 23 which is contained within ram cylinder 25 supported on the van step 27.

This ram 23 and cylinder 25 serve as structural reinforcement for the arm means and entire lifting mechanism. They also produce the lifting power for the wheel chair and occupant, as disclosed hereafter. For purposes of stability and structural integrity, a structural bolt or the like, may be affixed to the top of gear 19a and extend through a bore in plate 15, thus permitting rotation of gear 19a while imparting vertical stability to the ram cylinder. Binding of the sliding collar is also precluded.

Extending outwardly from the rotatable cap 21, and integrally connected thereto, is the first arm means or member 27. A second arm means 29 pivotally connected thereto.

Affixed to the second arm means or articulating arm 29 is the wheel chair support frame means. It may include housing 41 which is adapted to contain hydraulic cylinder means 43 having appropriate fluid entry and exit ports communicating therewith as needed (not numbered). The hydraulic cylinder means 43 serves to lift a portion of the wheel chair supporting frame, and hence the wheel chair and occupant, independent of movement of the articulating arms, in the manner hereinafter described.

Figure 3:
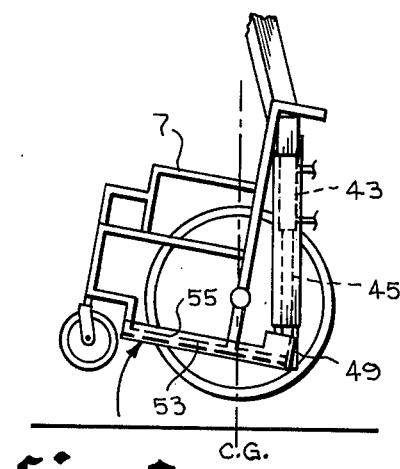
FIG. 3 is a side view of chair and supporting structure showing the relative orientation of the chair with respect thereto.

Extending from the cylinder means 43 and within housing 41 is a hydraulically driven piston 45 (see also FIG. 3) which communicates with the wheel chair base support frame 49. The frame member 49 is likewise integrally connected, such as by welding, to a pair of wheel chair support rails 53 (see FIGS. 1, 3 & 4) at its opposite ends (see FIG. 4). The rails 53 are preferably U-shaped tracks, (in cross section), and are of sufficient width to receive therein the lower frame members 55 of the wheel chair itself, (see FIG. 3). The wheel chair frame members 55 constitute an integral part of the wheel chair framework. These frame members 55 generally reside in a substantially horizontal position with respect to the ground upon which the wheel chair is supported. It may be noted, however, that the wheel chair support rails 53 (see FIG. 1) are not disposed in substantially horizontal relationship to the ground as is the wheel chair frame members 55. It may thus be visualized that once the wheel chair is operatively disposed with the wheel chair frame members 55 above the wheel chair support rails 53, that upon operative retraction of piston 45 into cylinder means 43 (see FIG. 4) the wheel chair support rails (see FIG. 1) not only engage and support the frame members 55 of the wheel chair but also and immediately upon the lifting thereof, tilts the wheel chair backwardly at an angle equivalent to the angle of the support rails 53 with respect to the ground. This orientation of the chair and occupant substantially precludes accidenta forward falling movement of the wheel chair occupant from the chair itself during lifting.

Figure 2:
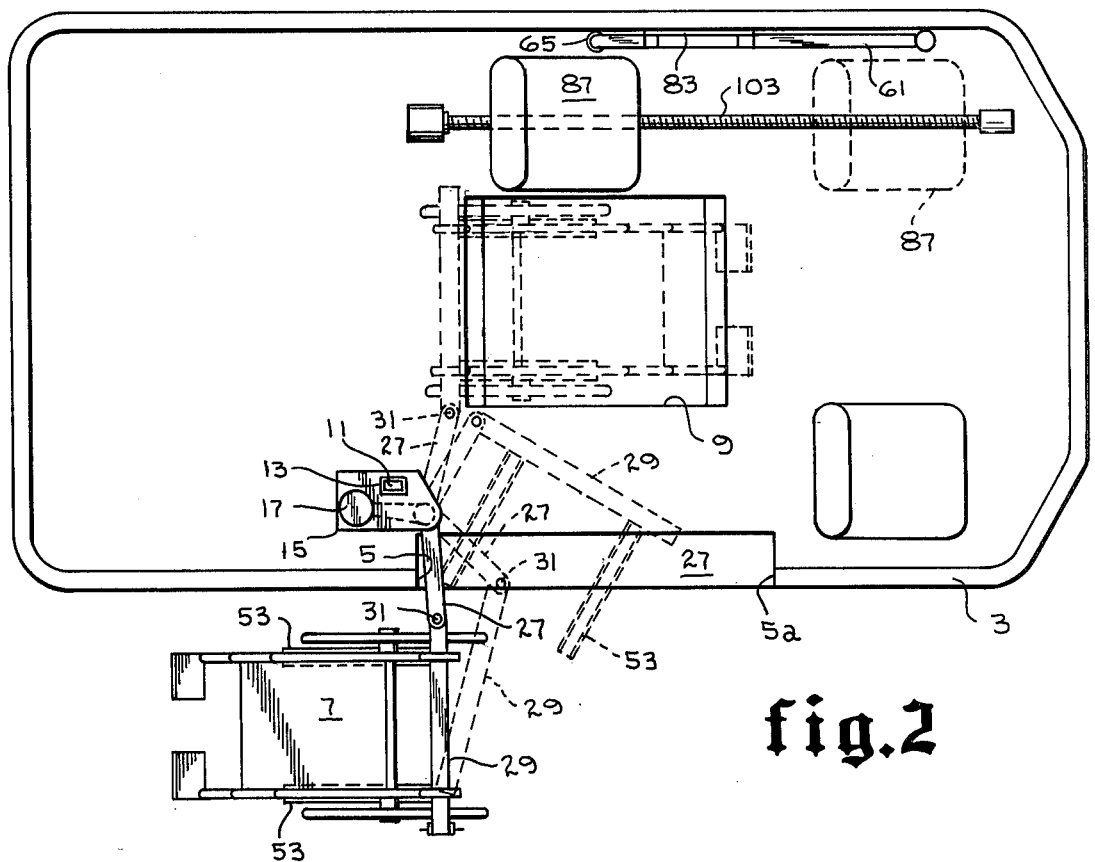
FIG. 2 is a top view of the van in cut-away along the Plane 2—2 of FIG. 1

As best shown in FIG. 1, the initial operative position of the lift mechanism maintains the wheel support rails 53 in adjacent relationship to the ground upon which the wheel chair rests. At such time the piston 45 is actuated to initially tilt the wheel chair. Then, by actuation of appropriate switch (not shown), rame 23 is withdrawn into ram cylinder 25 such that the ram cylinder is caused to be hydraulically filled so as to raise ram 23 upwardly and hence correspondingly raise the plate 15 and collar 13 and the associated components described herein above. In so doing, the cap 21 on top of the ram causes member 27 to likewise move vertically thus causing upward vertical movement of the entire wheel chair support assembly. After the lifting occurs, and as best shown in FIG. 2, the articulating arm 29 begins to move from its linear relation with rotation member 27 to an angular relation, which angular relationship eventually approaches a right angle. This is produced by actuation of motor 17. The rotating member 27 therefore moves in a more substantial arc than does articulating arm 29, thus enabling the cantalevered end of articulating arm 29 to be withdrawn inwardly so as to clear the opening 5a defined by the side doorway of the vehicle. The rotating member continues its pivotal movement until it reaches a substantially inwardly directed position, as best shown by the dotted lines in FIG. 2, at which time the wheel chair has been moved entirely inwardly of the vehicle and is positioned in forward facing direction immediately above the well 9. It will be recognized that the rate of movement of the rotating member 27 is determined by the motor and associated drive trains described in exemplary fashion in FIG. 4. When position above the well, the hydraulic control to ram cylinder 25 may be actuated to lower the mechanism, thus lowering the wheel chair to the floor of the well. All of this is accomplished by the wheel chair occupant who has continuing access to actuating toggle switches. It will be recognized, however, thus far that only three toggle switches have been used by the occupant or other person, these toggle switches being the one to engage the chair, one to initiate upward vertical movement of the chair support frame and a subsequent toggle switch to initiate rotational movement of the support mechanism. The second switch may then be used to lower the chair into the well. All of these toggle switches are readily placable at any appropriate position in or on the surface of the van so that even a person who is substantially totally paralyzed can, with the slightest touch, independently dispose himself and his chair within the van without second party assistance. The wheel chair itself is commonly of the powered variety and in such instances it will be recognized that the occupant can maneuver himself to the van lift mechanism and independently accomplish access to and positioning in the vehicle.

It will be recognized that the foregoing description and drawings represent only exemplary forms of the invention and that the concepts pertaining thereto may be manifest in other structural arrangements than that which is herein described and shown; and that therefore the following claims should be interpreted in accordance with the ordinary meanings of the words contained therein rather than in respect to the specific structures shown and described by way of exemplary fashion herein.

Therefore, that which is claimed and desired to be secured by United States Letters Patent is:

1. In a lifting and lowering apparatus for wheelchairs and the occupants thereof to and from a motor vehicle comprising:

a supporting strut means vertically disposed within the vehicle, an articulating arm means operatively interconnected to said supporting strut means for moving vertically with respect thereto, a wheelchair support frame supported from the remote end of the articulated arm means and including a pair of rail supports for supportively receiving the rails of a wheelchair and, motive power means and lifting means operatively associated with the articulating arm means for moving a wheelchair on the rail supports to and from the interior of the vehicle and, said rail supports being disposed at an angle with respect to the horizontal so that the ends thereof proximate the front of a wheelchair carried thereon are higher than the back, thereby producing a backward tilt to the wheelchair during the lifting thereof, said wheelchair support frame including a substantially vertically disposed support housing bar, and coupling means connecting said rail supports to said support housing bar, said coupling means being vertically movable toward said articulating arms upon actuation thereof so as to move the wheelchair on the ground and thus tilt it rearwardly prior to operation of said articulating arm means.

2. The lifting mechanism of claim 1 wherein said articulating arm means comprise a pivoted first arm member and a second horizontally disposed arm member, said arms being pivotally connected at a common end thereof so as to produce movement with one with respect to the other.

3. In a lifting and lowering apparatus for wheelchairs and the occupants thereof to and from a motor vehicle comprising:

a supporting strut means vertically disposed within the vehicle, an articulating arm means operatively interconnected to said supporting strut means for moving vertically with respect thereto, a wheelchair support frame supported from the remote end of the articulating arm means and including a pair of self-supports for supportively receiving the rails of a wheelchair and, motive power means and lifting means operatively associated with the articulating arm means for moving a wheelchair on the rail support to and from the interior of the vehicle, said lifting means comprising:

a collar slidably affixed to said supporting strut means and a cylinder means having a piston means therein disposed adjacent to said strut means and in parallel axial relation thereto, one of said articulating arm means being mechanically coupled to said piston means so that upon reciprocal movement thereof the articulating arm means is caused to move accordingly, said piston means being mechanically interconnected to said sliding collar so that said strut means serves to ensure structural stability of the lifting apparatus during operation thereof, said wheelchair support frame including a substantially vertically disposed support housing bar and, coupling means connecting said rail support to said support housing bar, said coupling means being vertically movable toward said articulating arms upon actuation thereof so as to move the wheelchair from the ground thus tilting it rearwardly prior to operation of said articulating arm means.

4. The lifting mechanism of claim 3 wherein said articulating arm means comprises a first pivotally mounted arm member and a second arm member pivotally connected at one end of the first arm member so as to produce varying degrees of radial and arcuate movement at the remote end of the second arm with respect to the pivotally mounted end of the first arm.

5. In combination with a vehicle for carrying a passenger therein, the improvement including a lifting apparatus for transporting a wheelchair and its occupant into and out of the vehicle comprising:

a strut means affixed integrally to the vehicle in substantially vertical position, a support means affixed to said strut means and adapted to move upwardly and downwardly with respect thereto, cantilevered arm means extending outwardly from said support plate means for carrying a wheelchair support from on the end thereof, a wheelchair support frame carried on the remote end of said cantilevered arm means, and power means for moving said support plate means so as to carry the wheelchair and its occupant into and out of the vehicle, said wheelchair support frame including rail support means thereon for supportively receiving a wheelchair and occupant, said rail support means being vertically movable independently of the arm means and sloped as as to incline the wheelchair into a secure disposition as the same is moving between the ground and the vehicle interior.

6. In combination with a vehicle for carrying a passenger therein, the improvement including a lifting apparatus for transporting a wheelchair and its occupant into and out of the vehicle, comprising:

a strut means affixed integrally to the vehicle in substantially vertical position;

a support plate means affixed to said strut means and adapted to move upwardly and downwardly with respect thereto;

cantilevered arm means extending outwardly from said support plate means for carrying a wheelchair support frame on the end thereof, said cantilevered arm means being pivotable about its supported end;

a wheelchair support frame on the remote end of said cantilevered arm means, said wheelchair support frame including a pair of wheelchair rail supports for receiving thereon the frame of the wheelchair, said wheelchair rail supports being vertically movable with respect to the wheelchair support frame and sloped such that the wheelchair is tilted during lifting in a way to prevent accidental sliding thereof from the rail supports;

power means for moving said support plate means on said strut means so as to carry a wheelchair and its occupant into and out of the vehicle; and means for raising the rail supports prior to actuation of said power means so that the wheelchair and occupant are tilted during lifting in a direction counter to gravitational force.

* * * * *